United States Patent Office 3,736,290
Patented May 29, 1973

3,736,290
METHOD FOR MAKING POLYIMIDE
BLOCK COPOLYMERS
William A. Fessler, Albany, N.Y., assignor to
General Electric Company
No Drawing. Filed Mar. 1, 1972, Ser. No. 230,965
Int. Cl. C08f 11/04
U.S. Cl. 260—46.5 E    5 Claims

ABSTRACT OF THE DISCLOSURE

A method is provided for making polyimide-organic block polymers, such as polyimide-polydiorganosiloxane block copolymers involving the reaction of bisimides and organo diamines in the presence of an organic solvent, such as hexamethylphosphorictriamide.

---

The present invention relates to a method for making polyimide-organic block polymers involving a transamidation reaction between a bisimide and an organic diamine.

Prior to the present invention, polyimideorganic block polymers, such as polyimide-polydiorganosiloxane, were generaly based upon the contact of organic dianhydrides with amine terminated organic blocks, such as amino terminated polydiorganosiloxane. For example, Pat. 3,325,450—Holub, assigned to the same assignee as the present invention shows the production of certain polyimide-polydimethylsiloxane. Although prior art methods generaly provided valuable polyimide polydiorganosiloxane block polymers, polyamide acids were generally made as intermediates. The conversion of the polyamide acid to the polyimide state results in the production of water which must be azeotroped from the reaction mixture.

The present invention is based on the discovery that high molecular weight polyimide-organic block polymers, such as polyimide-polydiorganosiloxane block polymers can be made by a transamidation reaction involving contacting a bisimide with an amino terminated organosiloxane resulting in the evolution of ammonia. It has been found that the valuable results achieved in the practice of the present invention can be achieved if there is employed in the the reaction mixture organic solvent which is a solvent for the resulting polyimide-organic block polymer such as hexamethylphosphorictriamide.

There is provided by the present invention, a method for making polyimide-organic block polymers which comprises (1) effecting reaction between substantially equal molar amounts of a bisimide of the formula:

(1)

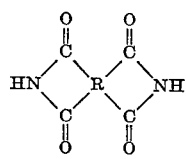

and a diamine of the formula, (2)             $NH_2R^1NH_2$ in the presence of an organic solvent at a temperature in the range of 0° C. to 200° C., (2) recovering a polyimide-organic block polymer from the mixture of (1), where R is a tetravalent organic radical containing at least one 6-carbon atom ring characterized by benzenoid unsaturation and wherein the four carbonyl groups are attached directly to different carbon atoms in the radical and wherein each pair of carbonyl groups is attached to adjacent carbon atoms in the 6-membered benzoid ring of the radical, $R^1$ is a member selected from $C_{(1-12)}$ alkylene and siloxane radicals of the formula, (3)

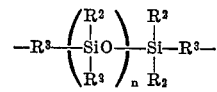

where $n$ is an integer equal to 1 to 200 inclusive, $R^2$ is selected from monovalent hydrocarbon radicals and $R^3$ is selected from divalent hydrocarbon radicals.

Radicals included by R of Formula 1 are more particularly,

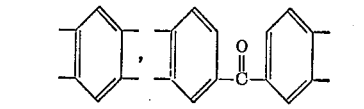

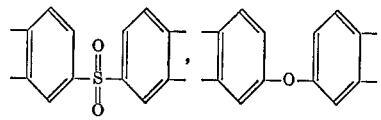

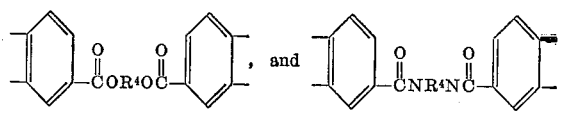

Radicals included by $R^1$ are more particularly methylene, ethylene, propylene, tetramethylene, pentamethylene, hexamethylene, heptamethylene, octamethylene, etc. Radicals included by $R^2$ are more particularly alkyl radicals such as methyl, ethyl, propyl, butyl, pentyl, etc.; aryl radicals such as phenyl, tolyl, xylyl, etc.; cyclo aliphatic radicals such as cyclohexyl, cycloheptyl, etc. Radicals included by $R^3$ are more particularly $C_{(1-8)}$ alkylene radicals such as methylene, ethylene, propylene, butylene, etc.; arylene radicals such as phenylene, xylylene, tolylene, etc.

Included by the bisimides of Formula 1 which can be employed in the practice of the invention are for example, benzophenone tetracarboxylic acid diimide, pyromellitic acid diimide, 1,4,5,8-naphthalene tetracarboxylic acid diimide.

Included by the diamines shown by Formula 2 are for example, 1,3-bis-(4-amino butyl)-1,1,3,3-tetra-methyl-disiloxane, 1,6-hexamethylene diamine, methylene dianiline, benzidine, etc.

In the practice of the invention, equal molar amounts of the bisimide and the diamine which hereinafter will signify both amino terminated siloxane or an amino terminated alkylene. Contact between the bisimide and the diamine can be achieved in the presence of an organic solvent which facilitates interreaction between the amine radical of the organic polymer and the hydrogen atom of the bisimide resulting in the production of ammonia.

Organic solvents which can be employed to facilitate transamidation in the method of the present invention are for example, hexamethylphosphorictriamide, N-methyl pyrrolidone, N,N-dimethylformamide, N,N-dimethylacetamide, N,N,N',N'-tetramethyl urea, dimethylsulfoxide, etc. An organic solvent can be employed which is inert to the reactants during the transamidation reaction and which provides for the formation of substantially high molecular weight block polymer as a result of the solubility of the block polymer in such organic solvent. Temperatures which can be utilized during reaction can vary from 0° C. to 200° C. During the reaction, the mixture is agitated such as by stirring, to facilitate the formation of the block polymer while providing interaction between the ingredients utilized in the reaction mixture. Depending upon such factors as the ingredients employed, solvent, degree of agitation, etc., the duration of reaction can be from 30 minutes or less to 18 hours or more. The course of the reaction can be determined by the evolution of ammonia.

In recovering block polymer, the reaction mixture can be added to excess methanol to effect the precipitation of the block polymer. The block polymer then can be recovered by conventional techniques such as by filtration, etc. and washed thoroughly with additional methanol and dried.

In order that those skilled in the art will be better able to practice the invention, the following examples are given by way of illustration and not by way of limitation. All parts are by weight.

EXAMPLE 1

There was slowly added to a solution of 10.451 parts of benzophenone tetracarboxylic acid diimide dissolved in 50 parts of hexamethylphosphorictriamide, a solution of 7.521 parts of 1,3-bis-(4-aminobutyl)-1,1,3,3-tetramethyldisiloxane in 20 parts of tetrahydrofuran. The mixture was stirred at room temperature for 3 hours. There was then added to the resulting mixture a tetrahydrofuran solution of 49.9 parts of α,ω-bis-(4-aminobutyl)-polydimethylsiloxane having an average of about 120 dimethylsiloxy units. The resulting mixture was then stirred at room temperature for 18 hours. On heating to 80° C., ammonia was evolved. The temperature of the mixture was maintained at 80° C. for 4 hours.

The mixture was then added to a 10-fold excess of methanol to effect a precipitation of product. After washing the product thoroughly with methanol, and drying at reduced pressure for about 12 hours there was obtained an 85% yield of dry block polymer. The intrinsic viscosity of the block polymer in tetrahydrofuran at 25° C. was 0.74 dl./g. Based on method of preparation, the block polymer consisted essentially of chemically combined units of the formula,

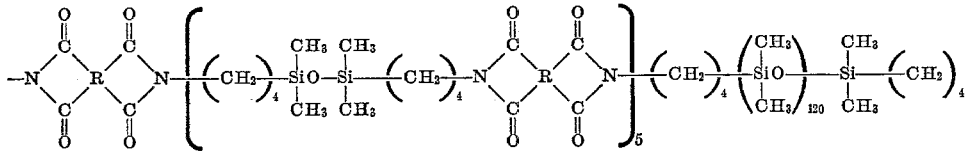

where R is

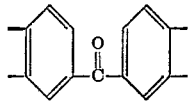

A film was cast from a solution of the above polymer in tetrahydrofuran. The film was dried at 150° C. for four hours. It was found to have a tensile strength of 544 p.s.i. The film exhibited valuable insulating properties and it could be extruded onto a copper wire to provide for an insulated copper conductor.

EXAMPLE 2

There was slowly added to a solution of 6.40 parts of benzophenone tetracarboxylic acid diimide dissolved in 40 parts of hexamethylphosphoric triamide, a solution of 2.05 parts of hexamethylene diamine in 20 parts of benzene. The mixture was stirred at room temperature for 2 hours. There was then aded to the resulting mixture, a benzene solution of 20 parts of an α,ω-bis-(4-aminobutyl)-polydiorganosiloxane having an average of about 120 diorgano siloxy units consisting essentially of about 95 mole percent dimethylsiloxy units and about 5 mole percent of diphenylsiloxy units. The resulting mixture was stirred at 70° C. for 6 hours, during which time ammonia was evolved.

The mixture was then added to a 10-fold excess of methanol to effect precipitation of product. After washing the fibrous product thoroughly with methanol, and drying at reduced pressure for 12 hours, there was obtained a 90% yield of dry block polymer. Based on method of preparation, the block polymer had chemically combined units of the formula,

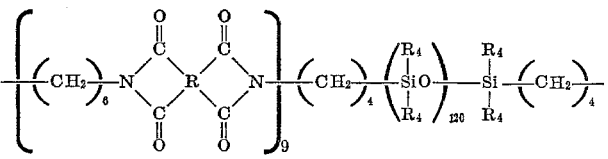

where R is

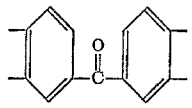

and $R^4$ is 0.95 methyl and .05 phenyl.

A film was cast from a solution of the block polymer. The film was dried at 165° C. for 16 hours. It was found to have a tensile strength of 141 p.s.i. and elongation at break of 154%. The films were elastomeric and exhibited valuable adhesive and sealant properties.

Although the above examples are limited to only a few of the many block polymers which can be made by the method of the invention, it should be understood that the method of the present invention is broadly directed to block polymers made by reacting a bisimide of Formula 1 and an organodiamine of Formula 2.

What I claim as new and desire to secure by Letters Patent of the United States is:

1. A method for making polyimide-organic block polymer which comprises (1) effecting reaction between substantially equal molar amounts of a bisimide of the formula,

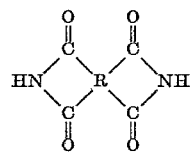

and a diamine of the formula, $$NH_2R^1NH_2$$

in the presence of organic solvent at a temperature in the range of from 0° C. to 250° C. (2) recovering a polyimide block polymer from the mixture of (1), where R is a tetravalent organic radical containing at least one 6-carbon atom ring characterized by benzenoid unsaturation and wherein the 4-carbonyl groups are attached directly to different carbon atoms in the radical and wherein each pair of carbonyl groups is attached to adjacent carbon atoms in the 6 membered benzenoid ring of the radical, $R^1$ is a member selected from $C_{(1-12)}$ alkylene and siloxane radicals of the formula,

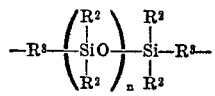

where $n$ is an integer equal to 1 to 200 inclusive, $R^2$ is selected from monovalent hydrocarbon radicals and $R^3$ is selected from divalent hydrocarbon radicals.

2. A method in accordance with claim 1, where the diamine is said amino terminated polydiorganosiloxane.

3. A method in accordance with claim 1, where the diamine is said amino terminated polyalkylene.

4. A method in accordance with claim 1, where the bisimide is benzophenone diimide.

5. A method in accordance with claim 2, where the amino terminated polydiorganosiloxane is a polydimethylsiloxane.

References Cited
UNITED STATES PATENTS
3,435,002   3/1969   Holub _____ 260—46.5

DONALD E. CZAJA, Primary Examiner

M. I. MARQUIS, Assistant Examiner

U.S. Cl. X.R.
260—78 TF, 824 R